US009248072B2

(12) United States Patent
Wu

(10) Patent No.: US 9,248,072 B2
(45) Date of Patent: Feb. 2, 2016

(54) FIXING DEVICE FOR ADJUSTING A TELESCOPING ARRANGEMENT

(71) Applicant: Ching-Tsang Wu, Xinbei (TW)

(72) Inventor: Ching-Tsang Wu, Xinbei (TW)

( * ) Notice: Subject to any disclaimer, the term of this patent is extended or adjusted under 35 U.S.C. 154(b) by 147 days.

(21) Appl. No.: 14/044,950

(22) Filed: Oct. 3, 2013

(65) Prior Publication Data

US 2015/0093182 A1 Apr. 2, 2015

(30) Foreign Application Priority Data

Sep. 27, 2013 (TW) .............................. 102218178 U

(51) Int. Cl.
*F16B 7/10* (2006.01)
*A61H 3/04* (2006.01)
*F16B 7/14* (2006.01)

(52) U.S. Cl.
CPC .. *A61H 3/04* (2013.01); *F16B 7/14* (2013.01); *A61H 2003/046* (2013.01); *A61H 2201/0161* (2013.01); *A61H 2201/0192* (2013.01); *A61H 2201/1633* (2013.01); *Y10T 403/32467* (2015.01); *Y10T 403/32483* (2015.01); *Y10T 403/32508* (2015.01); *Y10T 403/32524* (2015.01)

(58) Field of Classification Search
CPC .............. Y10T 403/32467; Y10T 403/32508; Y10T 403/32524; Y10T 403/7077; Y10T 403/7079; Y10T 403/7088; Y10T 403/7086; A01B 12/006; A61H 2201/0161; A61H 2201/1633; A61H 3/04; A45B 19/04; F16B 7/14; E04H 15/46

USPC ................ 403/109.1, 109.6, 109.8, 373, 377, 403/379.4, 379.5, 109.3
See application file for complete search history.

(56) References Cited

U.S. PATENT DOCUMENTS

| 6,575,656 | B2 * | 6/2003 | Suh ............................ 403/109.6 |
| 7,025,522 | B2 * | 4/2006 | Sicz et al. .................. 403/109.2 |
| 7,066,676 | B2 * | 6/2006 | Tsai ............................ 403/109.3 |
| 7,410,179 | B2 * | 8/2008 | Lonkvist .................. 280/47.371 |
| 7,708,490 | B2 * | 5/2010 | Rossi ............................ 403/293 |
| 7,849,867 | B2 * | 12/2010 | Takayama ..................... 135/114 |
| 7,980,519 | B2 * | 7/2011 | Chen .......................... 248/125.8 |
| 2006/0051159 | A1 * | 3/2006 | Tsai ............................ 403/109.3 |
| 2007/0012346 | A1 * | 1/2007 | Choi ............................ 135/114 |

* cited by examiner

Primary Examiner — Gregory Binda
Assistant Examiner — Nahid Amiri
(74) Attorney, Agent, or Firm — Rosenberg, Klein & Lee

(57) ABSTRACT

A fixing device for adjusting a telescoping arrangement comprises a seat disposed on an outer telescoping tube, a propelling arrangement disposed on the seat and inserted into limiting slots of an inner telescoping tube, a locking arrangement pivotally disposed on the seat to prop against the propelling arrangement, and a fastening arrangement fixing the locking arrangement to the seat. The movement of the locking arrangement toward the seat pushes the propelling arrangement to position the telescoping tubes, and concurrently an elastic member of the fastening arrangement springs against a fastening member of the fastening arrangement to make a fastening part of the fastening member lock with a fastened member which is disposed on the seat and thus position the locking arrangement, thereby preventing an unexpected slide of the telescoping tubes caused by touching the locking arrangement carelessly and increasing the use safety efficiently.

3 Claims, 6 Drawing Sheets

FIXING DEVICE FOR ADJUSTING A TELESCOPING ARRANGEMENT

BACKGROUND OF THE INVENTION

1. Field of the Invention

The present invention relates to a fixing device, particular to a fixing device for adjusting a telescoping arrangement.

2. Description of the Related Art

Telescoping tubes are constituted by sliding an inner tube over another outer tube and using a fixing device applied to adjust a telescoping length for use and fix the tubes in a position. Therefore, the user can adjust the use length according to his demand to obtain the usefulness and convenience of the product.

However, the prior fixing device for positioning the telescoping tubes is merely operated by lodging a handle in any slot of the inner tube. The handle without any safety design causes the handle to be easily touched due to user's carelessness and incurs an unexpected separation of the handle from the slot. Thus, the inner tube and the outer tube lose their supports suddenly, which makes the user unable to react instantly and causes him to fall or to be injured. The prior art has a poor use safety and needs improvements.

SUMMARY OF THE INVENTION

The object of the present invention is to provide a fixing device for adjusting a telescoping arrangement which prevents the telescoping tubes from losing their supports unexpectedly if the fixing device is touched carelessly, thereby increasing the use safety efficiently.

In accordance with the aspect of the present invention, there is provided a fixing device for adjusting a telescoping arrangement. The telescoping arrangement is formed by telescoping inner and outer tubes. The fixing device comprises a seat disposed on the outer tube, a propelling arrangement disposed on the seat and inserted into limiting slots of the inner tube, a locking arrangement pivotally disposed on the seat to prop against the propelling arrangement, and a fastening arrangement disposed to fix the locking arrangement to the seat. An opening is defined on the locking arrangement. The fastening arrangement comprises a fastening member pivotally disposed on the locking arrangement, a fastened member disposed on the seat, and an elastic member disposed between the fastening member and the locking arrangement. The fastening member further comprises a fastening part which is inserted into the opening for locking with or separating from the fastened member. Accordingly, when the locking arrangement is moved toward the seat, not only does the locking arrangement push the propelling arrangement to fix the telescoping arrangement, but also the elastic member springs against the fastening member to make the fastening part lock with the fastened member, thereby fixing the locking arrangement in the position. To adjust the length of the telescoping arrangement by moving the locking arrangement apart, a location on the fastening member directing where the elastic member is disposed needs to be firstly pressed so that the separation of the fastening part from the fastened member allows the locking arrangement to have a move and become disengaged. Therefore, the present invention prevents the unexpected slide of the telescoping tubes caused by touching the locking arrangement carelessly and increases the use safety efficiently.

Preferably, the propelling arrangement includes a propelling member propelled by the locking arrangement for entering the limiting slots and a returning member disposed between the seat and the propelling member.

Preferably, the propelling member is limited within the seat by using a blocking plate fastened to the seat.

The advantages of the present invention over the known prior arts are more apparent upon reading following descriptions injunction with the drawings.

DETAILED DESCRIPTION OF THE PREFERRED EMBODIMENTS

Figure 1:
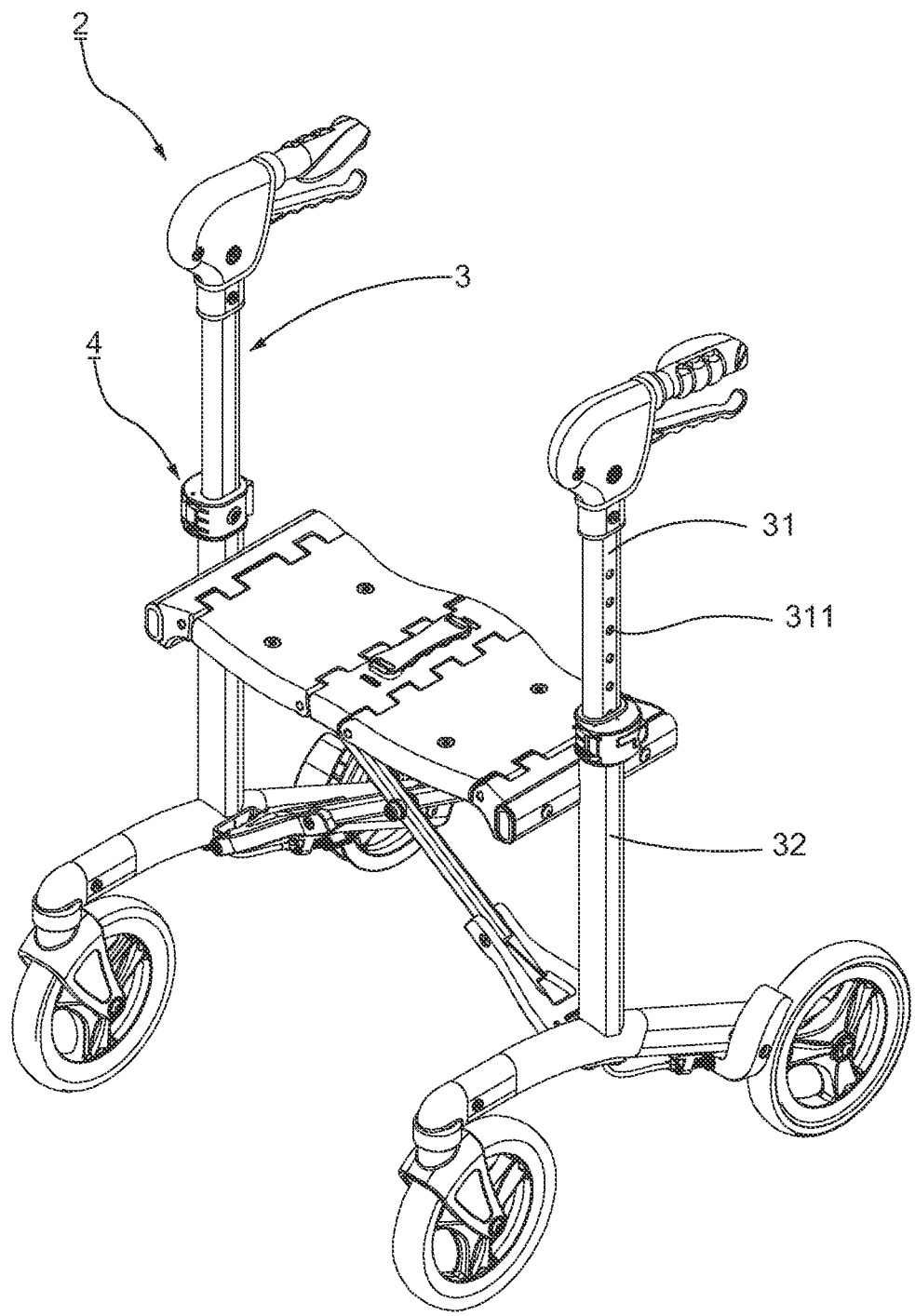
FIG. 1 is a perspective view showing a preferred embodiment of the present invention.

Referring to FIG. 1 shows a first preferred embodiment of the present invention comprises a telescoping arrangement 3 and a fixing device 4 cooperating therewith. The telescoping arrangement 3 includes telescoping inner and outer tubes 31, 32 and a plurality of spaced-apart limiting slots 311 formed on the inner tube 31. The telescoping arrangement 3 can be applied to a walking aid 2 as herein adopted or applied to other vehicles needing a telescoping adjustment.

Figure 2:
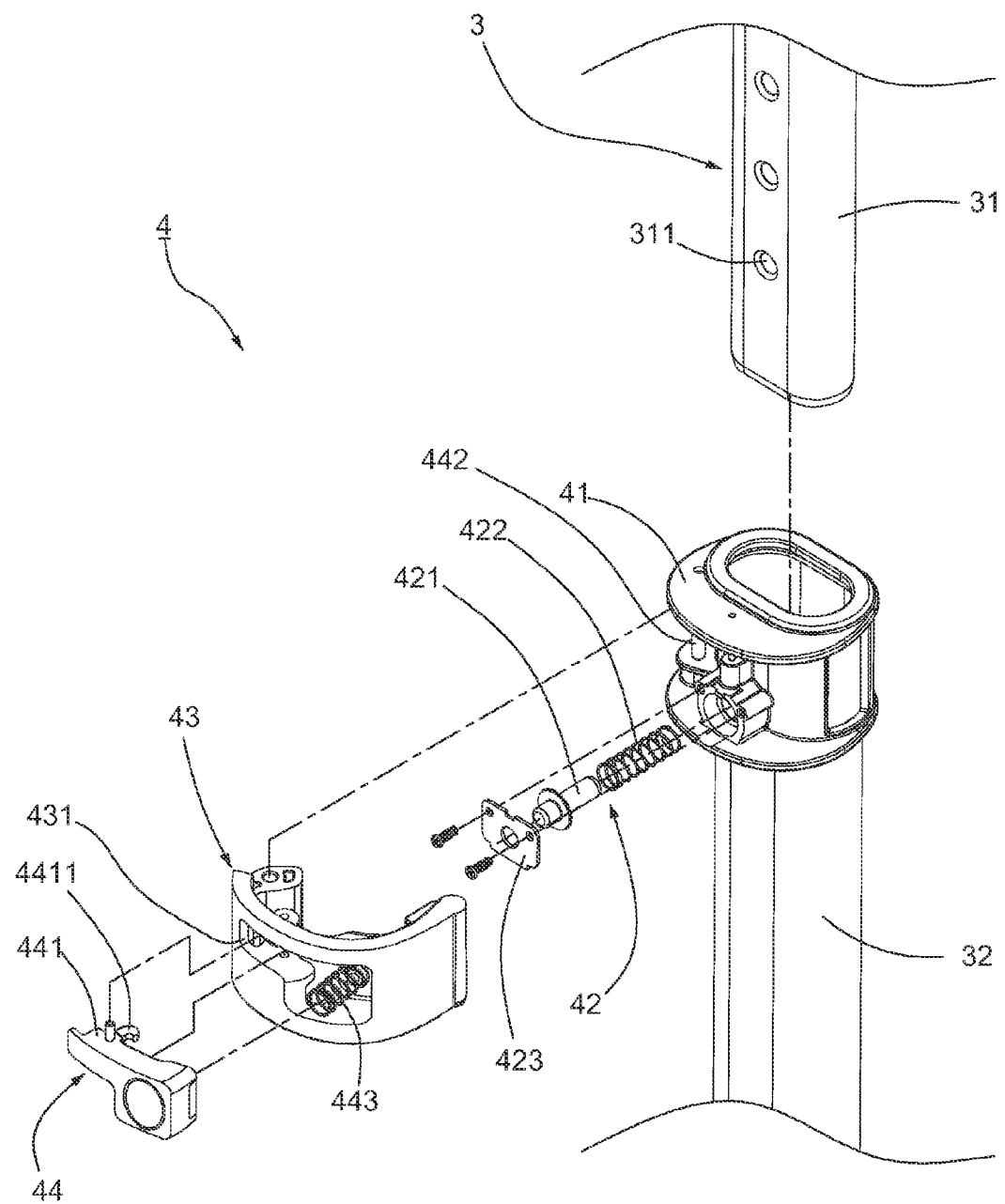
FIG. 2 is a partial exploded view showing the preferred embodiment of the present invention.
Figure 3:
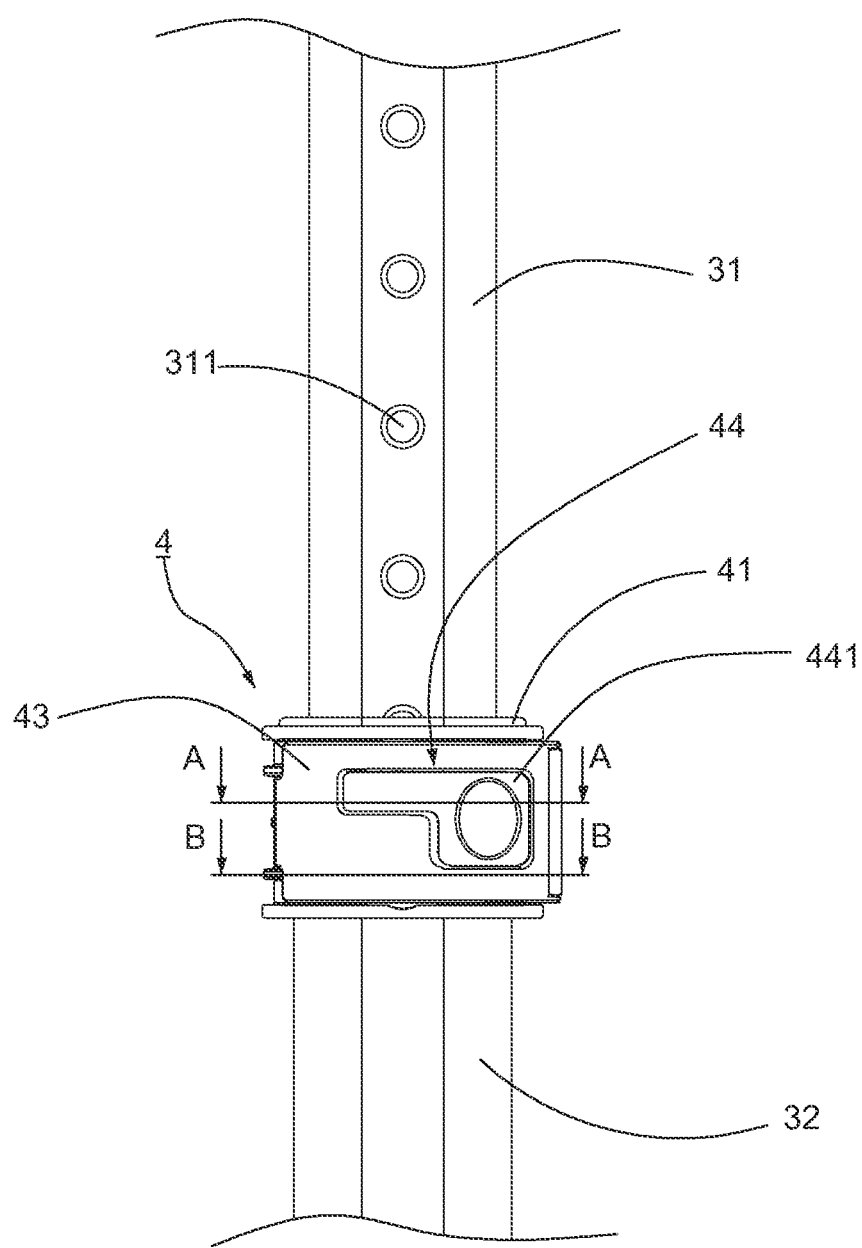
FIG. 3 is a schematic view showing the preferred embodiment of the present invention.

Referring to FIG. 2 and FIG. 3, the fixing device 4 comprises a seat 41 disposed on the outer tube 32, a propelling arrangement 42 disposed on the seat 41 and inserted into the limiting slots 311, a locking arrangement 43 pivotally disposed on the seat 41 to prop against the propelling arrangement 42, and a fastening arrangement 44 disposed to fix the locking arrangement 43 to the seat 41. The locking arrangement 43 has an opening 431 defined thereon for allowing an entry of the fastening arrangement 44. Also referring to FIG. 4, the fastening arrangement 44 comprises a fastening member 441 pivotally disposed on the locking arrangement 43, a fastened member 442 disposed on the seat 41, and an elastic member 443 disposed between the fastening member 441 and the locking arrangement 43. The fastening member 441 further comprises a fastening part 4411 which is inserted into the opening 431 for locking with or separating from the fastened member 442. In the preferred embodiment, the fastening part 4411 is preferably formed into a hook shape for locking with the fastened member 442. Also referring to FIG. 5, the propelling arrangement 42 can preferably include a propelling member 421 propelled by the locking arrangement 43 for entering the limiting slots 311 and a returning member 422 disposed between the seat 41 and the propelling member 421. The propelling arrangement 42 can further include a blocking plate 423 fastened to the seat 41 so that the propelling member 421 is limited within the seat 41 by using the blocking plate 423.

Figure 4:
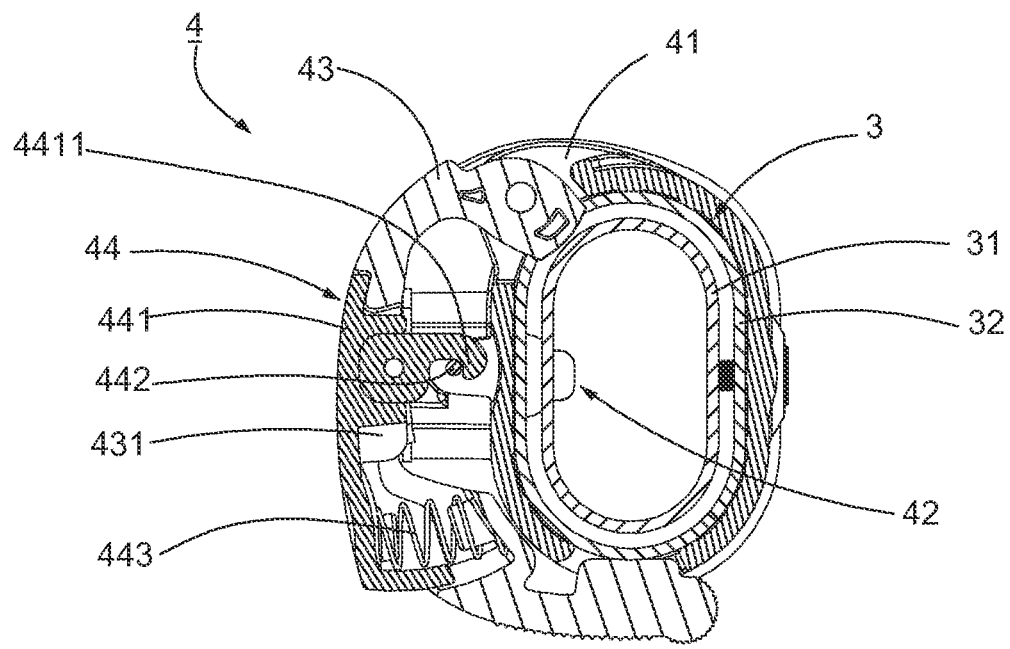
FIG. 4 is a cross-sectional view showing A-A section of FIG. 3.
Figure 5:
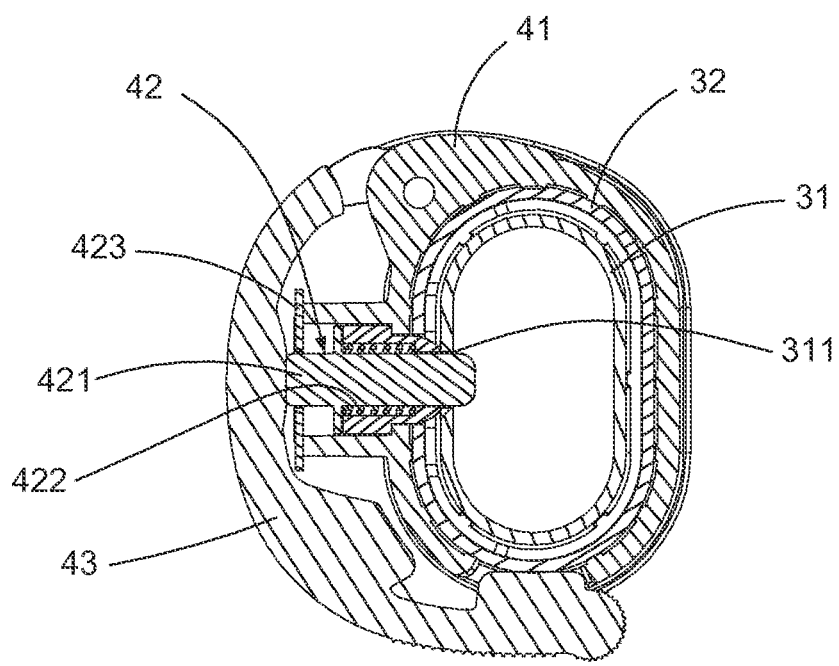
FIG. 5 is a cross-sectional view showing B-B section of FIG. 3.
Figure 6:
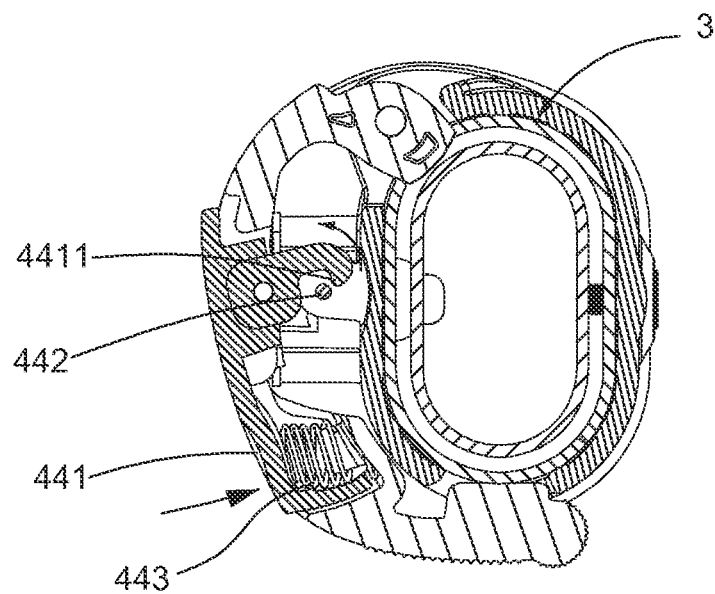
FIGS. 6-9 are schematic views showing operations of the preferred embodiment of the present invention.
Figure 7:
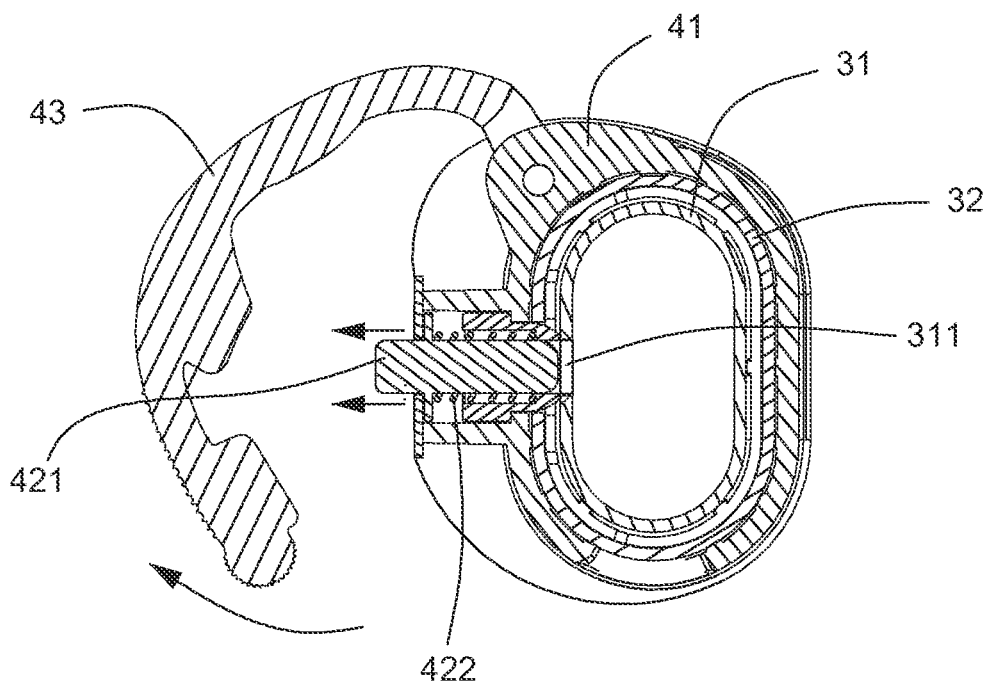
Figure 8:
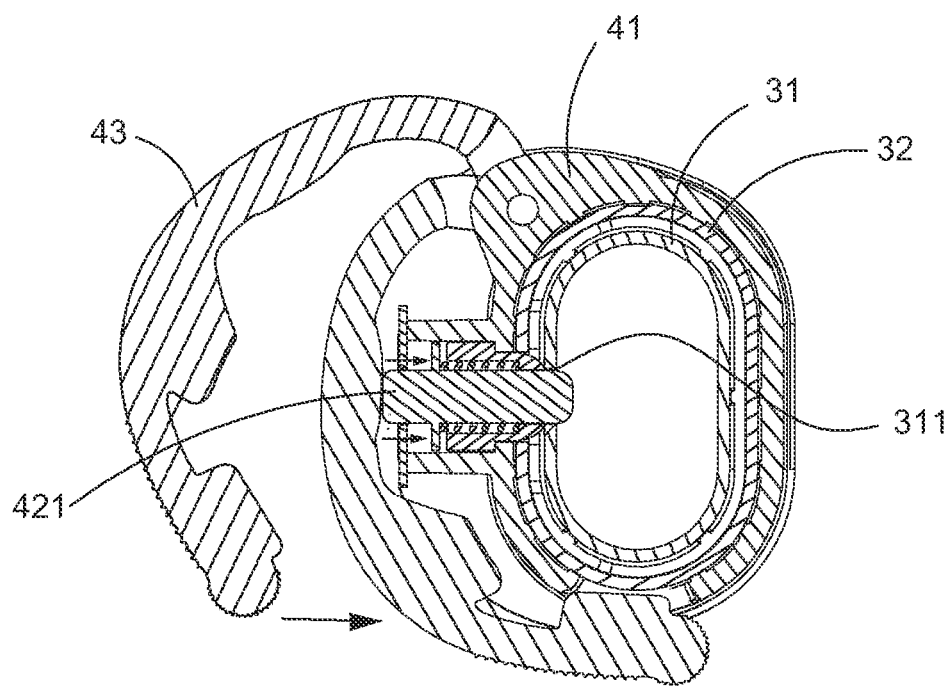
Figure 9:
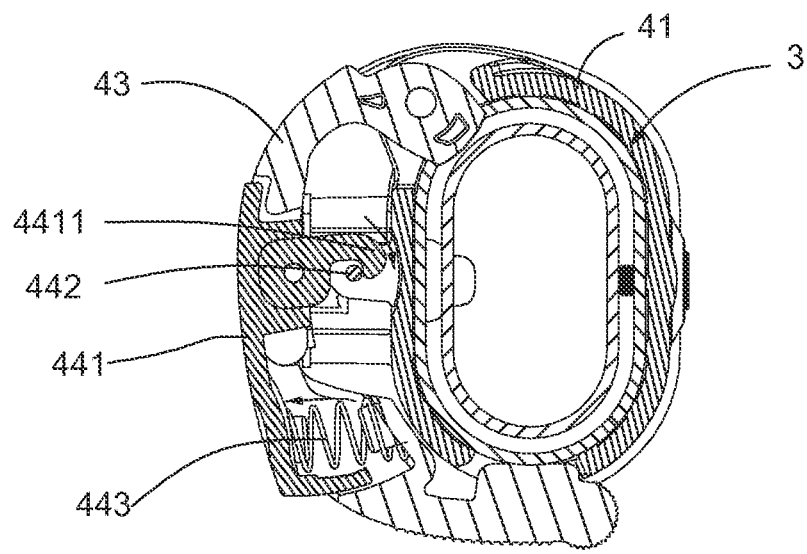

Referring to FIG. 4 and FIG. 6, when a user wishes to adjust a length of the telescoping arrangement 3, he must press one end of the fastening member 441 firstly, namely the end directed at the place where the elastic member 443 is located, to make the fastening part 4411 leave the fastened member 442 as illustrated in FIG. 6. The user keeps pressing the fastening member 441 to maintain the separation of the fastening part 4411 from the fastened member 442. By following the above status, the locking arrangement 43 can be moved from an original position (FIG. 5) toward a direction opposite to the seat 41 as arrowed in FIG. 7 to disconnect the propelling member 421 from the locking arrangement 43 and allow a returning force of the returning member 422 to push the propelling member 421 to move toward a direction opposite to the limiting slot 311. Thus the propelling member 421 is moved away from the limiting slot 311 to release the fixing relationship between the inner tube 31 and the seat 41 and then allow the inner tube 31 to slide over the outer tube 32, thereby attaining a telescoping adjustment of the required length. As referring to FIG. 8, when the user wishes to fix the inner tube 31 again, the locking arrangement 43 is moved toward the seat 41 to allow the locking arrangement 43 to prop and push the propelling member 421 into the limiting slot 311 whereby the inner tube 31 and the seat 41 are fixed and positioned again. Further when the locking arrangement 43 is moved toward the seat 41, the elasticity of the elastic member 443 springs against the fastening member 441 and allows the fastening part 4411 to engage with and lock with the fastened member 442 as illustrated in FIG. 9, thereby fixing the locking arrangement 43 in the position. Therefore, in the operation of the present invention, the movement of the locking arrangement 43 can only be executed while the fastening member 441 is pressed continuously to separate the fastening part 4411 from the fastened member 442 and thence pull the locking arrangement 43 apart, thereby adjusting the length of the telescoping arrangement 3 successfully. During or after the adjustment, the present fixing device 4 also prevents an automatic slide of the telescoping arrangement 3 which is caused by making the locking arrangement 43 actuated unexpectedly due to user's carelessness, thereby increasing the use safety efficiently.

To sum up, the present invention takes advantage of the cooperation between the locking arrangement and the fastening arrangement to fasten the telescoping arrangement by using the abutment of the locking arrangement against the seat which pushes the propelling arrangement to position the telescoping arrangement. Concurrently, the above cooperation also fixes the locking arrangement in a position by using the elastic member which causes the fastening part to lock with the fastened member. To adjust a length of the telescoping arrangement, the user keeps the fastening member pressed firstly to separate the fastening part from the fastened member and then pulls the locking arrangement apart, thereby preventing an unexpected slide of the telescoping tubes caused by touching the locking arrangement carelessly and increasing the use safety efficiently.

While the embodiments in accordance with the present invention are shown and described, it is understood that further variations and modifications may be made without departing from the scope of the invention.

What is claimed is:

1. A fixing device for adjusting a telescoping arrangement, said telescoping arrangement including telescoping inner and outer tubes, said fixing device comprising:
   a seat disposed on said inner and outer tubes;
   a propelling arrangement defining a biased pin extending through an opening formed in said seat, said pin passing through aligned apertures formed through sidewalls of said inner and outer tubes when said fixing device is in a locking position for constraining said inner and outer tubes each to the other;
   a locking arrangement defining a housing having a first end pivotally disposed on said seat and a second end having a lug member for engagement with said seat, said housing having an inner wall for bearing against said biased pin when the fixing device is in said locked position; and
   a fastening arrangement defining a locking mechanism having a fastening member with a fastening end for engaging and disengaging with a fastening pin member fixed to said housing;
   an elastic member being disposed between said fastening member and said housing;
   whereby when said fastening member is in said locking position, said fastening end is engaged with said fastening pin member; and when said fastening member is rotatably displaced, said fastening member is disengaged with respect to said fastening pin member and said lug member is released from said seat, said biased pin is removed from said aligned apertures to permit displacement of said outer and inner tubes with respect to each other.

2. The device according to claim 1, wherein said biased pin includes a biasing member disposed between said seat and said biased pin.

3. The device according to in claim 2, wherein said biased pin is limited within said seat by a blocking plate fastened to said seat.

* * * * *